July 24, 1923.
R. S. WILE ET AL
1,463,027
VACUUM WALLED CONTAINER
Filed Dec. 12, 1919
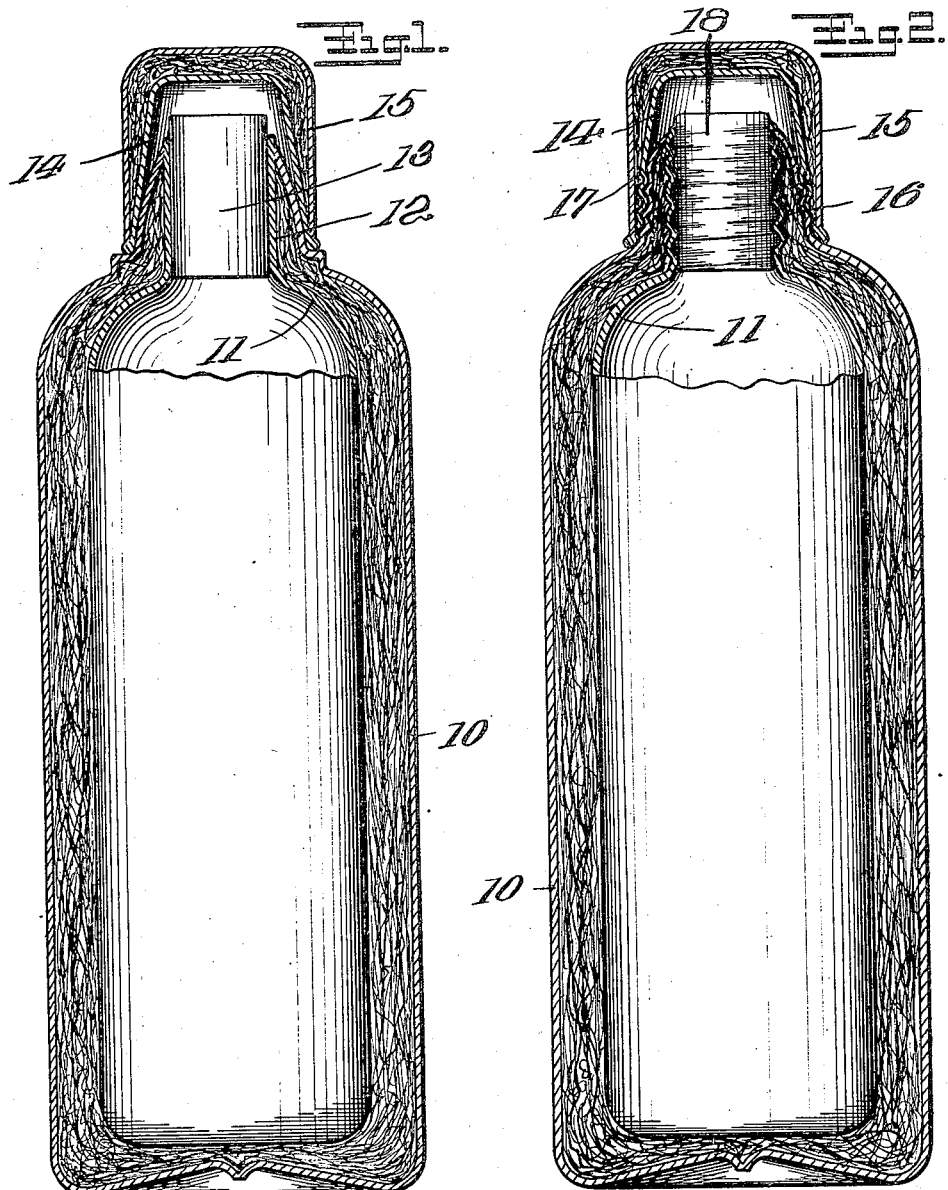
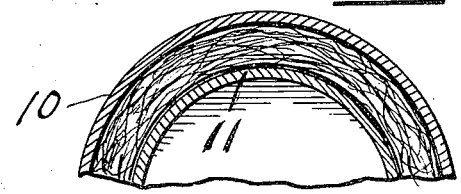
Raymond Samuel Wile
Sidney Herbert Gobay
Henry D Donnelly
Inventors
By their Attorney Patented July 24, 1923.

1,463,027

UNITED STATES PATENT OFFICE.

RAYMOND SAMUEL WILE AND SIDNEY HERBERT GOBAY, OF NEW YORK, N. Y.

VACUUM-WALLED CONTAINER.

Application filed December 12, 1919. Serial No. 344,275.

*To all whom it may concern:*

Be it known that RAYMOND SAMUEL WILE and SIDNEY HERBERT GOBAY, respectively, citizens of the United States, each residing at the borough of Manhattan, city of New York, in the county of New York and State of New York, have invented certain new and useful Improvements in Vacuum-Walled Containers, of which the following is a specification.

This invention relates to vacuum walled containers such as are used for keeping articles in the condition, as regards temperature, in which they are when placed therein.

More particularly the invention relates to a metallic walled heat insulating receptacle of the vacuum type.

It is a well known fact that metallic walled vacuum bottles and the like have heretofore been constructed, but such vessels have been open to the objection that only a low vacuum could be obtained, owing to the porosity of the walls as ordinarily constructed with the consequent occlusion of gases which were gradually given off if a high vacuum was first used so that the vacuum was broken down.

One important object of the invention is to provide an improved form of vacuum walled vessel so constructed that a high vacuum, with its consequent improved heat insulation, can be obtained and maintained.

A second objection inherent in the usual forms of metallic walled vessels of this description resides in the fact that the confronting surfaces of the inner and outer walls are dull or dark and thus the inner surface of the respective wall readily absorbs the heat from the space between the walls and the outer surface of such wall gives off the heat to the surrounding atmosphere or the contents of the vessel, according to the difference in temperature between such contents and the atmosphere.

A second important object of this invention is to provide an improved vessel of this class wherein provision will be made for greatly decreasing the absorption and transmission of heat by the walls of such a vessel.

Another objection to the usual type of bottles of this class lies in the fact that occasionally the vacuum is broken through accident and the vessel becomes worthless.

A third important object of the invention is the provision of an improved vessel of this class having means to prevent total destruction of the heat insulating function of the device.

A fourth important object of the invention is the provision of a cover, preferably in the form of a cup, which will have all of the heat insulating qualities and arrangement of the body of the vessel.

And still another important feature of our invention is the provision of a vessel or receptacle having a corrugated neck.

With the above and other objects in view, as will be hereinafter apparent, the invention consists in general in certain novel arrangements of details and means to effect the improvements sought as hereinafter fully described, illustrated in the accompanying drawings and specifically claimed.

In the accompanying drawings like characters of reference indicate like parts in the several views, and Fig. 1 is a vertical section through a vacuum bottle as constructed in accordance with this invention, the form shown employing the ordinary frictionally held stopper and a frictionally held cup.

Fig. 2 is a similar view of such a bottle employing a screw held cup and corrugated neck.

Fig. 3 is a horizontal section through a portion of such a bottle.

In the embodiment of the invention illustrated in the accompanying drawings there is shown a vacuum walled bottle. This is, however, merely typical of any desired form of such a vessel and it is not desired to restrict the invention to any particular form or shape of vessel. When, therefore, the term "bottle" is used in this specification it is to be understood as covering any form or shape of vessel.

In the embodiment illustrated the bottle is provided with the usual outer wall 10 and inner wall 11. In the form shown in Fig. 1 a plain neck 12 is provided wherein is fitted a smooth stopper 13, the outside of the neck being conoidal in form to receive the cup forming a cap. This cup consists of an inner wall 14 and outer wall 15 spaced therefrom, the cup of Fig. 2 being of identical wall construction, but fitted to the corrugated and threaded neck 16 by suitable screw threads 17. Within the corrugated neck 16 is fitted a stopper 18, the corrugations thus providing heat insulating spaces as well as a larger path of travel through the metal so that heat cannot pass into or from the bottle.

In order to prevent occluded gas from escaping from the walls into the space between them as is apt to be the case when such walls are left of the ordinary metal employed, the inside of the outer wall and outside of the inner wall of both bottle and cap are densely plated with a metal, preferably nickel, which has practically no occluding property and to prevent heat from passing from the space between the walls into either wall the plating is highly polished and thus reflecting instead of absorbing the heat. Thus a high vacuum may be utilized and, except for accidents, maintained and the heat insulating efficiency caused to be correspondingly high.

In order to maintain insulating efficiency, even if the vacuum breaks down, it is preferred to place in the space between the walls of both vessel and cup a quantity of kieselguhr 18, or diatomaceous earth, in its natural state, which has great heat resistivity.

There has thus been provided an improved vessel of the class described and for the purpose specified.

Having thus described the invention, what is claimed as new is:

1. In a vacuum walled vessel, spaced inner and outer walls of occluding material enclosing a vacuum chamber and having their confronting surfaces coated with non-occluding material to prevent occlusion of gases and polished to reflect heat rays and prevent absorption thereof by said walls.

2. In a vacuum walled vessel, spaced inner and outer occluding metallic walls enclosing a highly exhausted vacuum chamber, the confronting surfaces of said walls being nickel plated and polished.

3. A vacuum walled bottle having a vacuum walled neck, the inner wall of said neck being circumferentially corrugated whereby to lengthen the path of heat escaping from the bottle longitudinally of the neck.

4. A vacuum receptacle comprising a vacuum chamber having walls formed of metal treated to prevent the discharge of material from said walls into the vacuous space in said chamber, the vacuum-forming surfaces of said walls having a mirror lining.

In testimony whereof we have affixed our signatures.

RAYMOND SAMUEL WILE.
SIDNEY HERBERT GOBAY.